United States Patent [19]

Braschel et al.

[11] Patent Number: 4,929,034
[45] Date of Patent: May 29, 1990

[54] ANTI-LOCKING BRAKE CONTROL SYSTEM

[75] Inventors: Volker Braschel, Heilbronn; Dieter Seitz, Schwieberdingen, both of Fed. Rep. of Germany

[73] Assignee: Robert Bosch GmbH, Fed. Rep. of Germany

[21] Appl. No.: 274,143

[22] PCT Filed: Mar. 25, 1987

[86] PCT No.: PCT/EP87/00167
§ 371 Date: Sep. 26, 1988
§ 102(e) Date: Sep. 26, 1988

[87] PCT Pub. No.: WO87/05872
PCT Pub. Date: Oct. 8, 1987

[30] Foreign Application Priority Data

Mar. 26, 1986 [DE] Fed. Rep. of Germany ....... 3610186

[51] Int. Cl.$^5$ .................... B60T 8/58; B60T 8/60; B60T 8/32
[52] U.S. Cl. .................... 303/103; 188/181 C; 303/97; 303/106; 364/426.02
[58] Field of Search ........ 303/91, 100, 95–97, 303/102, 103, 105, 106, 107, 108, 110, 94; 93, 111; 188/181 C, 181 R; 364/426.02

[56] References Cited

U.S. PATENT DOCUMENTS

| | | | |
|---|---|---|---|
| 4,113,322 | 9/1978 | Ruhnau et al. | 303/105 |
| 4,230,376 | 10/1980 | Brearley et al. | 303/105 X |
| 4,260,200 | 4/1981 | Brearley et al. | 303/105 X |
| 4,320,459 | 3/1982 | Lindemann et al. | 303/105 X |
| 4,485,445 | 11/1984 | Braschel | 303/96 X |
| 4,585,280 | 4/1986 | Leiber | 303/105 X |
| 4,660,896 | 4/1987 | Matsuda | 303/106 |
| 4,666,218 | 5/1987 | Masaki et al. | 303/106 |
| 4,672,547 | 6/1987 | Masaki et al. | 303/97 X |
| 4,701,855 | 10/1987 | Fennel | 303/105 X |
| 4,717,209 | 1/1988 | Hagiya et al. | 303/103 X |
| 4,739,484 | 4/1988 | Fennel | 303/103 |
| 4,769,758 | 9/1988 | Masaki et al. | 303/105 X |
| 4,797,825 | 1/1989 | Shimanuki et al. | 303/103 X |
| 4,807,133 | 2/1989 | Shimanuki et al. | 303/105 X |

FOREIGN PATENT DOCUMENTS 3426665 2/1985 Fed. Rep. of Germany .
2151732 7/1985 United Kingdom .

Primary Examiner—Douglas C. Butler

[57] ABSTRACT

An anti-locking brake system is described in which pressure drops produced in the event of rapidly succeeding wheel retardations and wheel accelerations are restrained. This is achieved by a summing circuit having a sum to which a numerical value is added; the sum is reduced according to a given function. The sum value present in each case is a measure of how the pressure reduction is to be restrained, for example, by raising thresholds.

13 Claims, 2 Drawing Sheets

ANTI-LOCKING BRAKE CONTROL SYSTEM

BACKGROUND OF THE INVENTION

The invention relates to an anti-locking brake control system of the type having wheel velocity pickups, which provide signals to an evaluation circuit, which provides signals to brake pressure control valves. The evaluation circuit controls relief of pressure on the basis of wheel retardations and accelerations occurring in rapid succession.

When driving over rough roads a constant alternation takes place between the loading and unloading of the wheels. When the brakes are applied, therefore, a rapid succession of strong retardations and accelerations of the wheel circumference are produced. The electronic anti-locking brake control system therefore produces a frequent relieving of the brake pressure. This results in an underbraking of the vehicle.

To avoid this disadvantage it is known to suppress the relief of the brake pressure on a wheel for a period of time at the end of the reacceleration of this wheel.

It is furthermore known to trigger a rapid pressure increase in the event of great accelerations of the wheel circumference, which is intended to compensate for the previous pressure relief.

A sufficient increase in the brake pressure during the period when the wheel is reaccelerating is not possible in most cases, since, even on smooth roadways, strong accelerations occur which, in the event of rapid pressure rises such as would be necessary on rough road surfaces, can lead to unwanted disturbances caused by resonance.

Furthermore, it is known to determine the maximum wheel acceleration in the reacceleration phase of the wheel and increase the pressure relief threshold according to the magnitude of this acceleration, as disclosed in GB-A No. 2151732, to which U.S. Pat. No. 4,701,855 to Fennel corresponds.

SUMMARY OF THE INVENTION

The evaluation circuit of the present invention includes a summing circuit which provides a sum indicative of an instability threshold based on wheel retardation and/or slippage at which braking pressure is relieved. More particularly, the invention relates to increasing the instability threshold when the brakes are frequently applied. This is accomplished by reducing the sum in accordance with the given function, and increasing it by a numerical value whenever a wheel acceleration of a given magnitude occurs after an instability threshold is reached. The instability threshold at any time is determined by the magnitude of the sum at that time.

For example, after an instability is recognized, such as one caused by pressure retention or reduction, if a decided reacceleration of a wheel takes place, a down counter is increased by a certain amount. In particular, this counter can be common to several or all wheels of a vehicle and can be increased by all wheels which are affected by this counter. The counter continually counts down according to a given function. In the simplest case the countdown is linear. The countdown can also be blocked under certain conditions.

It is also possible to provide a separate counter for each wheel. However, then the complexity increases and effectiveness suffers.

BRIEF DESCRIPTION OF THE DRAWING

FIG. 1b is a plot of the counter value versus time for the conditions of FIGS. 1a.

FIG. 1c is a plot of brake pressure versus time for the conditions of FIG. 1a.

DETAILED DESCRIPTION OF THE PREFERRED EMBODIMENT

Figure 1A:
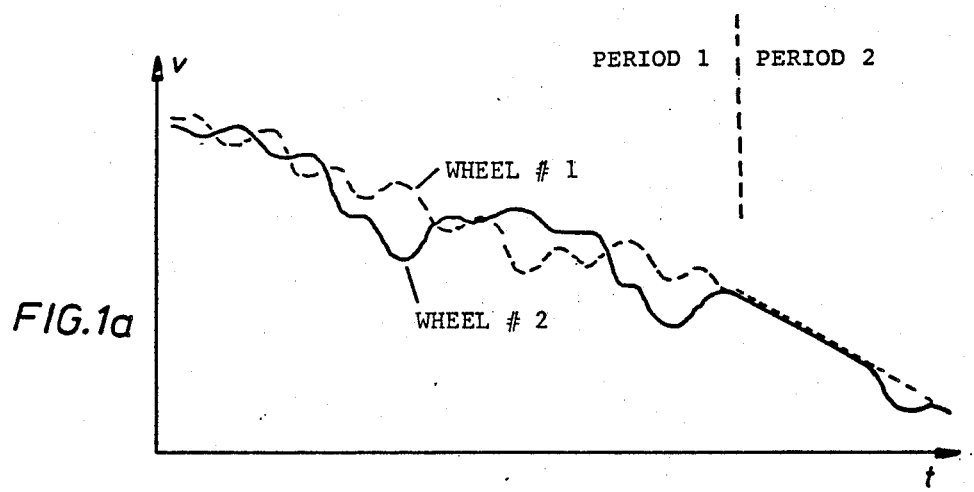
FIG. 1a is a plot of wheel velocities versus time during braking on a rough road (period 1) and a smooth road (period 2).
Figure 1B:
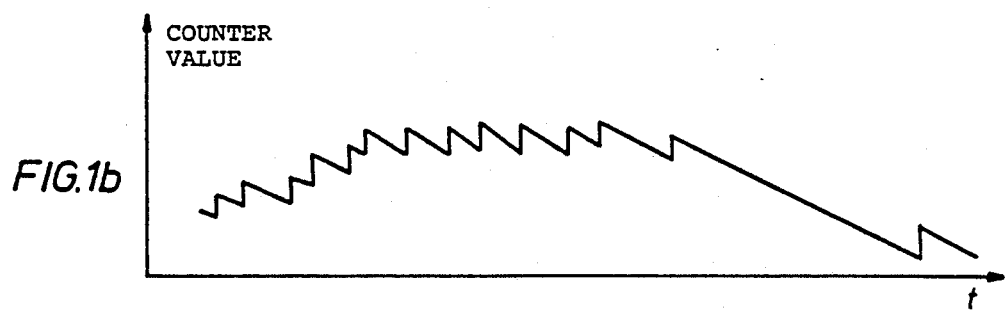
Figure 1C:
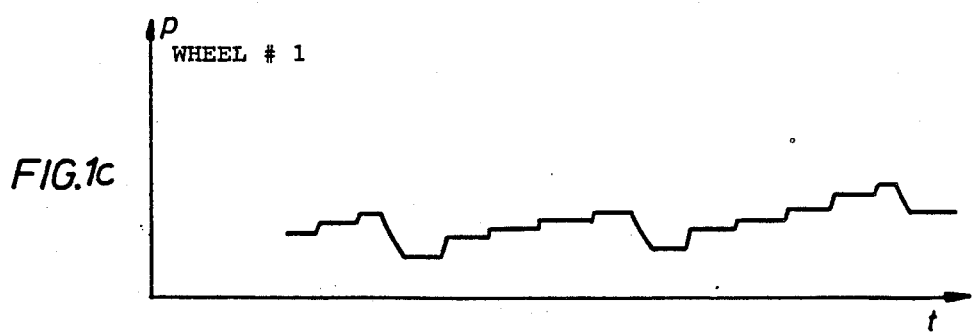

The count provided by the counter indicates the amount of the increase in the criteria controlling the detection of instability, i.e., by how much the detection thresholds are raised. FIGS. 1a to 1c show an embodiment in which two wheels, 1 and 2, increase the counter. In these figures the counter changes during braking on a rough road (period 1) and then during braking on a smooth road (period 2). By considering the state of the counter in determining instabilities, instances of erroneous pressure relief are reduced. On smooth roads, however, an instability is recognized early, and the pressure release is started in a timely manner. FIG. 1a shows the curves of the wheel velocities, FIG. 1b the curve of the counter value, and FIG. 1c the braking pressure at wheel 1. It can be seen that a very much greater wheel retardation and greater wheel slippage is required to produce a pressure release in period 1 than in period 2.

The amount by which the value in the counter is increased can be fixedly predetermined, or can depend on various factors such as wheel retardation. Furthermore, the counter can be counted down toward zero according to various functions.

When the brakes are very frequently applied, as on rough stretches on road, the instability threshold is very rapidly increased in accordance with the present invention. This is especially true when all wheels of a vehicle control a common counter.

If, as in the known devices, the delay time affecting the pressure relief were increased, the result would be that in the event of just a single rapid alternation of acceleration and retardation, even on smooth roadways, the instability would be detected very late and the wheel in question would consequently have very high slippage.

Figure 2:
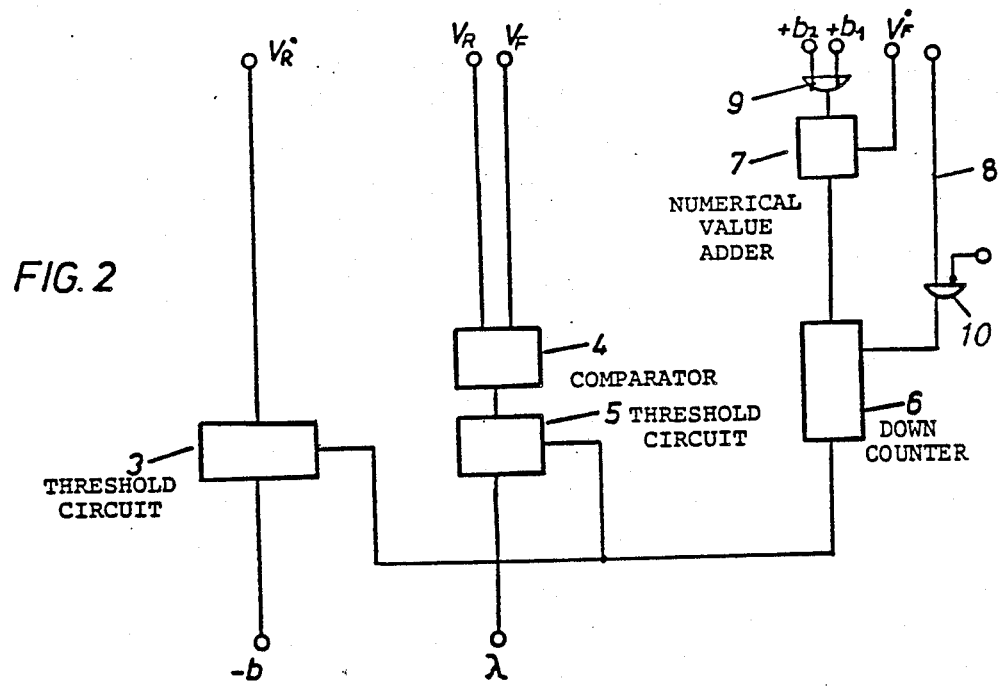
FIG. 2 is part of the evaluation circuit of an anti-locking control represented in FIG. 3.

FIG. 2 is a circuit diagram. In FIG. 2, signal $\dot{V}_R$ corresponding to wheel acceleration is fed to a threshold circuit 3, and signals corresponding to the wheel velocity $V_R$; and the vehicle velocity $V_F$ are fed to a comparator 4. Threshold circuit 5 is connected to the output of comparator 4. These threshold circuits 3 and 5, after a certain deceleration or a certain degree of slippage has been exceeded, respectively, produce signal $-b$ and signal $\lambda$, respectively. The thresholds of the threshold circuits 3 and 5 are variable and are varied on the basis of the value provided by a summing circuit in the form of down counter 6. A circuit 7 adds a numerical value to the count of counter 6 after a certain wheel acceleration (+b) is reached. The down counter 6 continually counts down in response to a pulsed signal provided via line 8. In special situations, e.g., when several wheels slip at the same time, the pulsed signal on line 8 can be temporarily blocked by means of an AND gate 10. When the numerical value provided by circuit 7 is be dependent upon vehicle retardation $\dot{V}_F$, a corresponding signal is fed to circuit 7. The OR gate 9 illustrates a way in which counter 6 can be increased by the +b signals from several wheels (+b$_1$, +b$_2$). Also, instead of the thresholds provided by threshold circuits 3 and 5, one variable instability criterion can also be used which triggers the actuation of the brake valves, in this case a common, quasi-analog evaluation of slippage and circumferential wheel acceleration is done. In this variant, only one threshold is present to which, after the addition of the weighted values of slip and deceleration, a sum value is fed. Note that the terms retardation and deceleration as used herein are synonymous.

Figure 3:
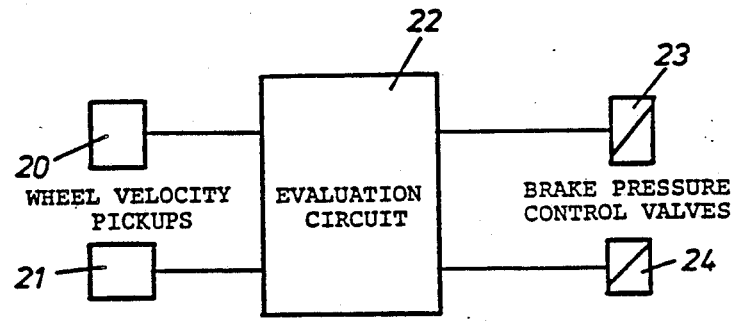
FIG. 3 is an anti-locking control arrangement.

The circuit shown in FIG. 2 is part of the evaluation circuit of an anti-locking control as represented schematically in FIG. 3. An evaluation circuit 22, which contains only two control channels in this example, is fed the signals from wheel velocity pickups 20 and 21, which produce brake pressure control signals for valves 23 and 24, based on these signals.

We claim:

1. An anti-locking brake control system of the type comprising wheel velocity pickups, an evaluation circuit, and brake pressure control valves, said pickups providing signals to said evaluation circuit which determines therefrom the wheel retardation, wheel slippage, and wheel acceleration, said evaluation circuit providing signals to the brake pressure control valves to relieve pressure when an instability threshold based on at least one of wheel retardation and wheel slippage is reached, said evaluation circuit comprising
    a summing circuit which provides a sum indicative of said instability threshold at which braking pressure is relieved,
    means for reducing the sum in accordance with a given function,
    means for increasing said sum by a numerical value whenever a wheel acceleration of a given magnitude occurs after an instability threshold is reached, the instability threshold at any time being determined by the magnitude of the sum at that time.

2. The anti-locking brake control system according to claim 1 wherein the summing circuit is a down counter whose count is increased by said numerical values and which counts down in accordance with said function.

3. The anti-locking brake control system according to claim 1 wherein said numerical values are constant.

4. Anti-locking brake control system according to claim 1 wherein said numerical values are variable.

5. Anti-locking brake control system as in claim 4 wherein said evaluation circuit determines the vehicle deceleration, said numerical value depending on said vehicle deceleration.

6. Anti-locking brake control system according to claim 1 wherein said sum is reduced linearly.

7. Anti-locking brake control system according to claim 6, wherein in given situations the linear reduction is interrupted by steady holding phases.

8. Anti-locking brake control system as in claim 7 wherein the linear reduction is interrupted by steady holding pulses, when a plurality of wheels reach a given slippage.

9. Anti-locking brake control system according to claim 1 wherein said sum value is increased by accelerations of a plurality of wheels.

10. Anti-locking brake control system as in claim 1 wherein said summing circuit determines the sum indicative of an instability threshold based upon a weighted signal of the wheel retardation and the wheel slippage.

11. Anti-locking brake control system as in claim 1 wherein said summing circuit determines the sum indicative of an instability threshold based upon either the wheel retardation or the wheel slippage.

12. Anti-locking brake control system as in claim 1 wherein the evaluation circuit comprises a retardation threshold circuit which determines the amount of wheel retardation which will result in the brake pressure being relieved, and a slippage threshold circuit which determines the amount of wheel slippage which will result in the brake pressure being relieved, the threshold being determined depending upon the sum provided by the summing circuit.

13. Anti-locking brake control system as in claim 12 wherein the evaluation circuit further comprises a comparator which receives signals corresponding to the wheel velocity and vehicle velocity, said comparator being connected to said slippage threshold circuit.

* * * * *